(12) United States Patent
Wakaki et al.

(10) Patent No.: US 8,371,739 B2
(45) Date of Patent: Feb. 12, 2013

(54) BACKLIGHT UNIT

(75) Inventors: Ryosuke Wakaki, Tokushima (JP); Akira Asano, Naruto (JP)

(73) Assignee: Nichia Corporation, Tokushima (JP)

( * ) Notice: Subject to any disclaimer, the term of this patent is extended or adjusted under 35 U.S.C. 154(b) by 287 days.

(21) Appl. No.: 12/058,135

(22) Filed: Mar. 28, 2008

(65) Prior Publication Data
US 2008/0239199 A1    Oct. 2, 2008

(30) Foreign Application Priority Data

Mar. 28, 2007 (JP) .................................. 2007-85733

(51) Int. Cl.
*F21V 7/04* (2006.01)
(52) U.S. Cl. ......................... 362/633; 362/632; 362/634
(58) Field of Classification Search ........... 362/632–634
See application file for complete search history.

(56) References Cited

U.S. PATENT DOCUMENTS

| 7,121,710 B2* | 10/2006 | Kim et al. ..................... 362/632 |
| 2002/0044234 A1 | 4/2002 | Choi |
| 2004/0257791 A1* | 12/2004 | Chen et al. ..................... 362/31 |
| 2005/0099604 A1* | 5/2005 | Mizumaki et al. .......... 353/27 R |
| 2005/0190577 A1 | 9/2005 | Nishida et al. |
| 2005/0254261 A1* | 11/2005 | Lo et al. ......................... 362/633 |
| 2006/0256583 A1 | 11/2006 | Shimizu et al. |
| 2006/0262570 A1 | 11/2006 | Kang |
| 2007/0030700 A1 | 2/2007 | Pan |

FOREIGN PATENT DOCUMENTS

| JP | 2004-165301 A | 6/2004 |
| JP | 2004/264400 | 9/2004 |
| JP | 2005-158707 A | 6/2005 |
| JP | 2005242174 A | 9/2005 |
| JP | 2006024483 A | 1/2006 |
| JP | 2006-323382 A | 11/2006 |

* cited by examiner

*Primary Examiner* — Diane Lee
*Assistant Examiner* — Sean Gramling
(74) *Attorney, Agent, or Firm* — Sughrue Mion, PLLC

(57) ABSTRACT

A backlight unit includes a light source, a light guide guiding light from the light source, an optical sheet disposed on the light guide, and an inner frame having an opening housing the optical sheet. A peripheral portion of the optical sheet includes a projection group respectively at each of the longitudinal sides that are among the constituent sides of an approximately rectangular external contour of the optical sheet. The projection group includes a first projection arranged in a projection insertion region provided in a side wall of the inner frame and a second projection arranged outside of the projection insertion region in the opening of the inner frame.

12 Claims, 4 Drawing Sheets

BACKLIGHT UNIT

BACKGROUND OF THE INVENTION

1. Field of the Invention

The present invention relates to a backlight unit that is a light source of a liquid crystal display device and, more particularly to a backlight unit in which a hitting noise caused by an optical sheet such as a diffusion film, reflective sheet, prism sheet, and in some case polarizing sheet installed in the backlight unit hitting an inner frame housing it is reduced.

2. Description of the Related Art

As display devices using a backlight unit as a light source, a liquid crystal television, a cell phone, and a display device mounted in a motor vehicle and the like can be cited. In a backlight unit installed in such display devices, a plural number of various kinds of optical sheets such as a diffusion sheet and a prism sheet are generally arranged forwardly of the light source such as a light emitting diode and a fluorescent tube. Because these optical sheets are arranged forwardly of the light source that generates heat when the backlight is turned on, they are subjected to the generated heat. The optical sheets may also be heated by a change in ambient temperature. When the optical sheets are heated, the widths of the optical sheets in longitudinal and lateral directions increase due to thermal expansion.

Generally, an optical sheet is housed in an inner frame formed in a part of a lower frame of the backlight unit. The inner frame is formed in view of processing tolerance of each member so that a portion for housing the optical sheet is larger than the optical sheet, in order to accommodate expansion and contraction of the optical sheet caused by changes in ambient temperature. For example, the opening portion housing the optical sheet is formed larger at least in view of the amount of size to increase by thermal expansion and in view of processing tolerance so that the optical sheet housed in the inner frame is not stretched out even when the optical sheet is thermally expanded. With this arrangement, a gap is defined between the circumferential portion of the optical sheet and the frame at normal temperature. Accordingly, the optical sheet is allowed to freely repeat expansion and contraction between a cold condition and a hot condition within the frame without suffering a restriction from the frame.

A backlight unit of a cell phone and a display device mounted in a motor vehicle also includes an optical sheet, and a supporting structure of the optical sheet is also provided with a gap defined between each side of the optical sheet and the frame, in view of thermal expansion. The optical sheet is supported so that the peripheral portion of the optical sheet is allowed to expand and contract in the gap. That is, in such backlight units, the optical sheet can freely move within the gap between the sides of the optical sheet and the frame when the optical sheet is not thermally expanded. As a result, for instance, when the display device body moves or a vibration from the outside is applied thereon, a shock may be generated to cause the optical sheet to move and hit the frame housing it, thus generating a hitting noise.

Such a hitting noise is undesirable because it may be unpleasant for a user of the display device. Therefore, it has been hoped that the optical sheet and the frame are prevented from hitting each other within the backlight unit so as to reduce the hitting noise to a level that would not be unpleasant to the user of the display unit. Particularly, it is important task in a display device installed in an auto vehicle is that of reducing direct contact between the optical sheets and the frame, caused by the vibration of the auto vehicle.

Accordingly, a projection formed integrally with an optical sheet is provided at each side of periphery of the optical sheet in a backlight unit described in JP2006-24483A, that includes an optical sheet housed freely movably within a frame by providing a gap between a periphery of the optical sheet and the frame in view of change in size of the optical sheet and the frame due to a change of ambient temperature and also of processing tolerance of the optical sheet and frame.

With the arrangement described above, possible hitting between the optical sheet and the frame occur in a small part compared with the cases where the optical sheet hits a side wall of the frame with its substantially entire side. Thus, hitting noise generated when the optical sheet moves to hit the frame can be significantly reduced than in the cases with a conventional structure In a backlight unit described in JP2006-24483A, protrusions are formed on all four sides of an optical sheet so that a part of each protrusion hits its facing wall. Thus, a hitting noise that is generated when the optical sheet moves to hit the frame is reduced.

However, in such backlight units, in all possible directions the optical sheet can move, the position of the optical sheet within the frame depends on the entire shape of the optical sheet and the expansion coefficient of the material of the optical sheet. For example, in a case of an optical sheet having an approximately rectangular outer shape, it may need to design the sizes of the gaps between the optical sheet and the frame in the transverse direction (X-direction) and the longitudinal direction (Y-direction) of the optical sheet respectively, in view of the expansion coefficient determined by the material of the optical sheet and also in view of processing tolerance of the optical sheet. In such cases, if there is no change in size due to expansion and constriction of the optical sheet even when the projections of each side of the optical sheet hits the frame as described in JP2006-24483A, the hitting noise may be too large.

SUMMARY OF THE INVENTION

Accordingly, an object of the present invention is to further reduce the hitting noise generated when the optical sheet moves and hits the frame without the position of the optical sheet being depends on the entire shape of the optical sheet.

To accomplish the object described above, a backlight unit according to the present invention includes a light source, a light guide guiding light from the light source, an optical sheet disposed on the light guide or optical waveguide, an inner frame defining an opening to housed the optical sheet, and a lower frame housing the above. The optical sheet has an approximately rectangular outer shape and the peripheral portion thereof has a projection group respectively on each of a pair of longitudinal sides. The projection group includes a first projection arranged in a projection insertion region on a side wall of the inner frame, and a second projection arranged outside of the projection insertion region within the opening portion of the inner frame. The projection insertion region is preferably a through hole defined in a side wall of the inner frame.

According to the present invention, a projection group to limit lateral or longitudinal movement of the optical sheet is provided on a part of peripheral portion of each of two longitudinal sides of the outer shape of the optical sheet. With this arrangement, a position of the optical sheet with respect to the inner frame does not depend on the longitudinal shape of the optical sheet and the hitting noise, generated when the optical sheet moves and hits the frame, can further be reduced compared with the conventional devices.

The above and further objects of the present invention as well as the features thereof will become more apparent from the following detailed description to be made in conjunction with the accompanying drawings.

DETAILED DESCRIPTION OF THE PREFERABLE EMBODIMENTS

The inventors of the invention conducted various studies on a backlight unit, in which a gap is defined between the periphery of an optical sheet and an inner frame in view of a change in size of the optical sheet due to thermal expansion so that the optical sheet is movably housed in the inner frame, in order to further reduce the hitting noise generated when the optical sheet moves and hits the inner frame.

As a result, the inventors have found that the object can be attained by providing a projection group on a peripheral portion of an optical sheet, respectively on a longitudinal side and on another opposite longitudinal side that are among the constituent sides of an approximately rectangular outer shape of the optical sheet, each projection group includes a first projection arranged in a projection insertion region provided in a side wall of the inner frame and an second projection arranged facing a part of an inner wall expanding outside of the projection insertion region within an opening defined in the inner frame, with the first projection and the second projection being arranged alongside.

According to the invention, a projection to limit longitudinal and lateral movements of an optical sheet housed in an inner frame is provided only on a peripheral portion of a longitudinal side of the optical sheet, contrary to a conventional related art in which a projection is provided on each side of outer shape of the optical sheet. According to the invention, a hitting involving only a significantly small part of the optical sheet occurs between a first projection, that is an extremely small part compared to the entire optical sheet, and a wall of the projection insertion region within a projection insertion region provided in a side wall of the inner frame, when the optical sheet moves in a longitudinal direction (Y-direction). Movement of the optical sheet in the lateral direction (X-direction) can be limited simultaneously, by a second projection provided alongside of the first projection. The second projection can also limit a rotational movement of the optical sheet centered around the first projection.

As described above, according to the invention, a movement of the optical sheet in the longitudinal or lateral direction is limited by the protrusion group provided to each longitudinal side of the peripheral portion of the optical sheet, regardless of variations in the gap between the lateral side of the peripheral portion of the optical sheet. Therefore, when the optical sheet is not thermally expanded, that is, when a gap exists between the peripheral portion of the optical sheet and the inner frame, a hitting noise generated between the optical sheet and the inner frame can be reduced compared with the conventional cases.

Figure 1:
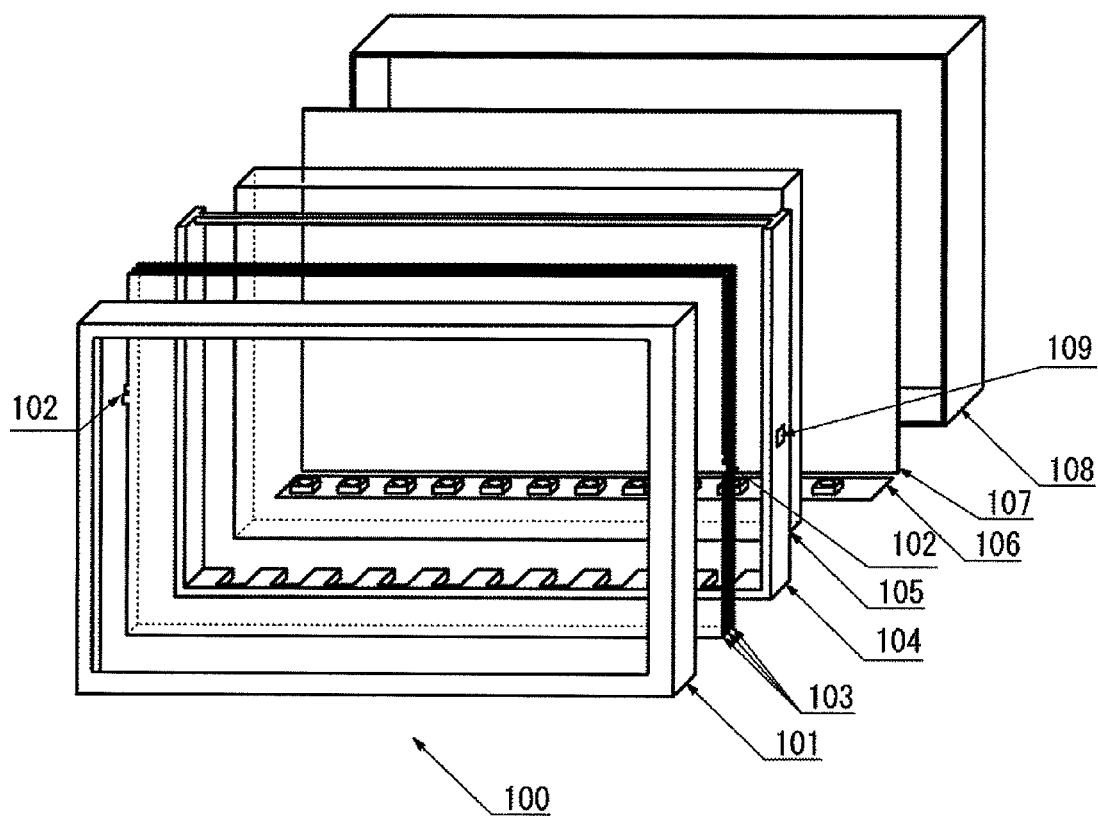
FIG. 1 is a perspective view illustrating each constitutive member of a backlight unit according to an example of the present invention.
Figure 2:
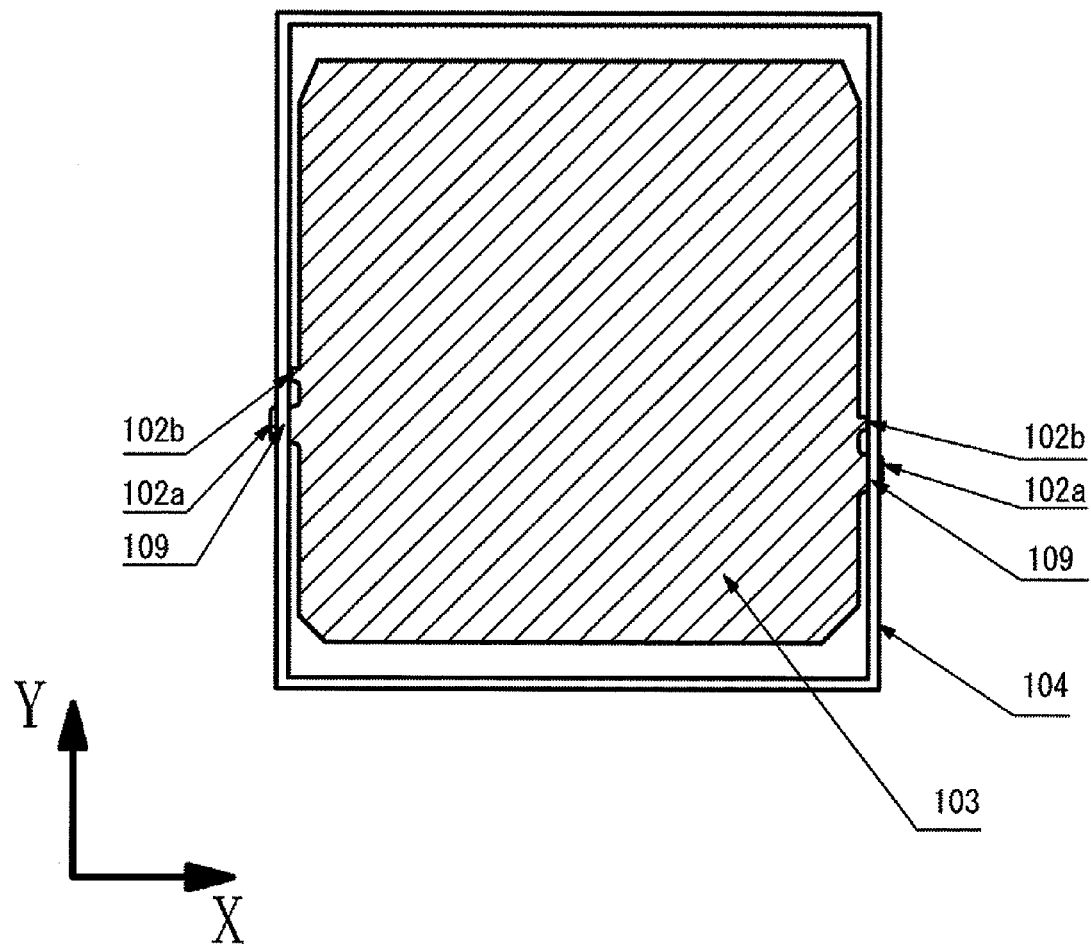
FIG. 2 is a top view illustrating a relationship between an inner frame and an optical sheet of a backlight unit according to an example of the invention.
Figure 3:
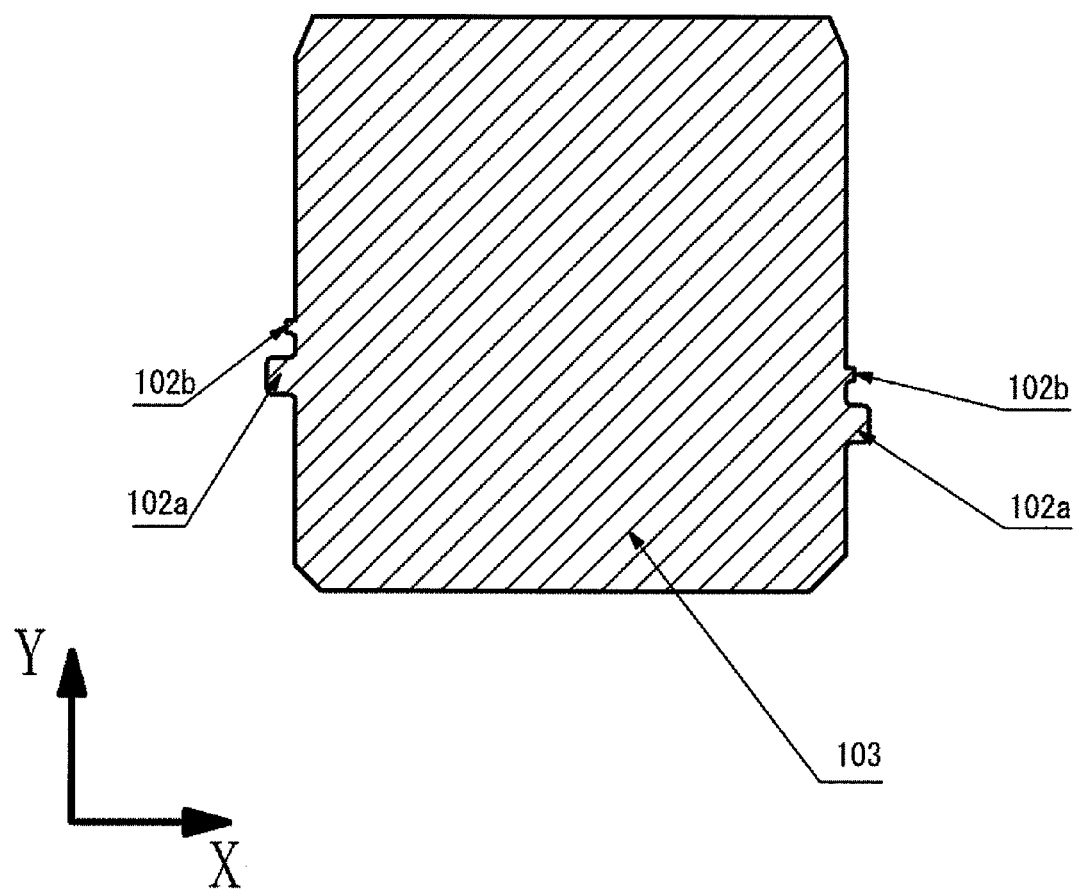
FIG. 3 is a top view showing an optical sheet of a backlight unit according to an example of the invention.

Hereinafter, the backlight unit of the embodiment will be described in detail with reference to the accompanying drawings. FIG. 1 is an exploded perspective view of a backlight unit 100 of the embodiment illustrating respective constitutive members. FIG. 2 is a top view illustrating a relationship between an inner frame 104 and an optical sheet 103 of a backlight unit 100 of the embodiment. FIG. 3 is a top view showing an optical sheet 103 of a backlight unit 100 of the embodiment.

The backlight unit 100 of the embodiment includes a reflection film 107 provided on an inner side of a lower frame 108 formed in a box shape, and a light guide 105 guiding light from a light source 106, optical sheets 103 provided over the light guide 105, and an inner frame 104 defining an opening to house the optical sheets 103, provided over the reflection film.

That is, in a recess portion of a lower frame 108, a light source 106 is arranged along a side wall of the recess, and a light guide 105 guiding light from the light source 106 arranged facing the incident surface, and the optical sheets 103 for optically controlling emitting light from the light guide 105 are housed stacked in this order from the bottom side of the recess. The optical sheets 103 of the embodiment includes a diffusion sheet, a first prism lens sheet, and a second prism lens sheet having a different aligning direction of prisms than that in the first prism sheet, stacked on the light guide 105 in this order from the light guide 105 side and housed within the inner frame 104. The shape of each of the optical sheets 103 is formed to correspond to the size and shape of the emitting surface of the light guide.

Further, an upper frame 101 having a slightly larger contour than that of the inner frame and protruding outward from the body portion of the lower frame and capable of fitting over the exterior of the side walls of the lower frame 108 is provided to the top surface side of the side walls of the lower frame 108. A liquid crystal panel, a color filter (not shown), and the like are arranged on the upper frame 101 to construct a liquid crystal display device.

When the optical sheets 103 disposed at the emission surface side of the light guide 105 are heated and thermally expanded, the expansion may cause each of the optical sheets 103 to move in the thickness direction of the backlight unit 100, inducing an optically defective response upon constructing a liquid crystal display device. Thus, a wrinkle, stain or the like may occur on the display surface of the liquid crystal display device. In order to prevent such situation, a backlight unit of the embodiment 100 has a configuration in which peripheral portion of each optical sheet is not completely restricted by other members so that the optical sheets 103 can thermally expand freely in parallel direction relative to the light extracting surface of the light guide 105

That is, each of the various optical sheets is heated by radiant heat from the light source and expands, so that each sheet is cut with a size predicted from a change in size due to the thermal expansion. Further, each of the optical sheets 103 of the embodiment has a projection group 102 at a peripheral portion of each of the longitudinal sides that are facing each other among the four sides of the contour of each of the optical sheets, a projection group 102 includes a first projection 102a and a second projection 102b each having a stripe shape and arranged at an appropriate interval.

The first projection 102a is engaged in the projection insertion region 109 of the inner frame 104. The projection insertion region 109 of the embodiment may be a recess or a through hole defined in a side wall defining the opening of the inner frame 104, toward the width direction thereof. If the body of the backlight unit 100 is moved by an abrupt external force, the optical sheets 103 may move from its initial position to any direction relative to the inner frame 104 by inertial force, and a part of the first projection 102a hits the inner wall surface of the projection insertion region 109. For example, if the X-direction and Y-direction indicated in FIG. 2 are applied, when the optical sheets 103 move in Y-direction, a peripheral portion of the first projection 102a extending in the direction hits the inner wall of the projection insertion region 109 facing the peripheral portion In addition, the second projection 102b is smaller than the first projection 102a and provided alongside the first projection 102a at a peripheral portion of a pair of longitudinal sides of each of the optical sheets 103. The second projection 102b is arranged to face an inner wall surface extending outside of the projection insertion region 109 in the opening of the inner frame 104, when the backlight unit 100 is assembled. The second projection 102b is generally arranged to allow a gap to be against an inner wall surface of the opening. However, when the optical sheets 103 move in X-direction, an end portion of the second projection 102b hits the facing inner wall of the opening. Alternately, when the optical sheets 103 rotatively move around a peripheral point of the first projection 102a, an end portion of the second projection 102b may hit a part of the inner wall surface defining the opening.

As described above, the optical sheets 103 and the inner frame 104 hit each other at the first projection 102a and the second projection 102b of the optical sheets 103 that is a small part compared with the entire optical sheets. Therefore, the generated hitting noise is smaller than that involving each side of the contour of the conventional optical sheets. Moreover, a gap between the peripheral portion extending in the lateral direction (X-direction) of the optical sheets and the inner frame can be relatively wider in view of thermal expansion in the longitudinal direction (Y-direction) of the optical sheets. Thus, even when the optical sheets are not thermally expanded, the hitting noise generated between the peripheral portion extending in the lateral direction of the optical sheets and the inner frame can be reduced. In addition, the gap between the second projection 102b and a side wall is arranged so that the second projection 102b does not or barely come in contact with a side wall even when the optical sheets are thermally expanded.

In the examples shown in the figures, each of the protrusions are stripe-shaped protruding from the general contour (a rectangular-shape) of an optical sheet, but other shapes can also be employed. The edge of the projection may be rounded in view of facility in engaging into the projection insertion region 109 of the inner frame 104. The projections may have other shapes such as a trapezoidal shape other than a stripe shape (rectangular shape), or such shapes can be employed in combination. Also, the first projection 102a and second projection 102b may have different shapes.

In the examples shown in the figures, the first projection 102a is larger than the second projection 102b. The shape of the inner wall of the opening of the inner frame 104 may be varied as long as the first projection 102a can be engaged in the projection insertion region 109 of the inner frame 104. Also, the first projection 102a and the second projection 102b are arranged in this order in Y-direction (direction indicated by a vertical arrow) in the figures, but any other order can be used. That is, the second projection 102b and the first projection 102a may be arranged in this order in Y-direction (direction indicated by a vertical arrow) in the figures In addition, in the examples shown in the figures, the projection groups 102 are located at a peripheral portion of each of the longitudinal sides of the optical sheets 103 so that the distance to each end of the longitudinal side is different at both of the longitudinal sides, in order to insert the optical sheets 103 to the lower frame 108 with the correct sides up when the backlight unit 100 is assembled. But if any measures are provided to insert the optical sheets with the correct sides up, a difference in distance as shown in the figures is not needed, and the projection groups 102 can be arranged approximately on the level at both of the longitudinal sides.

The projection group 102 includes each one of the first projection 102a and the second projection 102b in the embodiment, but two or more projections can be provided respectively, as long as the same level of effect as by the backlight unit of the embodiment can be obtained. The projection group 102 is not necessarily provided to each of all the optical sheets, and the projection group 102 may only be provided to the sheets that generate a hitting noise. Now, each of the members constructing the backlight unit 100 of the example will be described in detail below.

(Inner Frame)

The inner frame 104 used in the embodiment is a member defining an opening to house the optical sheets 103 and a light guide 105. When the backlight unit 100 is assembled, the inner frame is placed between a side surface of the light guide 105 and an inner surface of the lower frame 108 so that the optical sheets 103 and the light guide 105 can be retained at predetermined positions. Further, the inner frame 104 of the embodiment has a projection insertion region 109 to engage the first projection 102a provided at a peripheral portion of each of the optical sheets 103. At least a part of the first projection 102a is disposed in the projection insertion region 109.

The projection insertion region 109 of the embodiment is a hole or a recess defined in an inner wall surface of the inner frame 104 facing the first projection 102a in the direction that the first projection 102a to be inserted. Such a projection insertion region 109 can be formed integrally with the inner frame 104. Particularly, when the projection insertion region 109 is a hole defined through a side wall defining the opening of the inner frame 104 in the width direction, the contact surface area between the inner wall surface of the projection insertion region 109 and the peripheral portion of the first projection 102a increases compared with the case where the projection insertion region 109 is a recess. Thus, movement of the optical sheets in the longitudinal direction can be suitably controlled.

The projection insertion region 109 may be a depression cut into the inner frame 104 from the front side of the backlight unit as well as in the thickness direction of the side wall of the inner frame 104. Because this arrangement facilitates the placement of the optical sheets 103 to the inner frame 104 from the front side of the backlight unit 100 while engaging the first projection 102a into the projection insertion region 109 when assembling the backlight unit, as shown in FIG. 1 and FIG. 2.

The inner frame 104 can be formed in various shapes according to the shape of each member housed therein. That is, the inner frame 104 of the embodiment defines an opening capable of housing at least an optical sheet 103 and a light guide 105, and the size and shape of the opening is adjusted according to the size, shape and number of the light guide 105 to be housed. The width of the side wall defining the opening of the inner frame 104 is smaller than the gap between the side surface of the light guide 105 and the inner wall surface of the lower frame 108 defining the recess. With this arrangement, the inner frame 104 can be engaged in the gap between the side surface of the light guide 105 and the inner wall surface of the lower frame 108 defining the recess, so that the backlight unit 100 housing the light guide 105 and the inner frame 104 in the recess of the lower frame 108 can be assembled.

The inner frame 104 preferably has a light diffusing agent or a white or whitish pigment such as calcium carbonate, aluminum oxide, and titanium oxide, at least on the inner wall surface of the side wall defining the opening.

Such a side wall portion of the inner frame 104 is capable of reflecting light from the light source 106 toward the incident surface of the light guide 105, and reflecting light emitting from the lateral direction of the light guide toward or into the light guide 105.

An insulating material having excellent mechanical strength such as polycarbonate, polyetheretherketone, and fluorocarbon resin may be used as a material of the inner frame 104. Further, the inner frame may also be formed by using an injection molding mold with a resin material including a light diffusing agent such as calcium carbonate, aluminum oxide, and titanium oxide.

(Light Guide)

The light guide 105 used in the embodiment is a translucent member capable of guiding light from the light source introduced from a part of an end surface by using internal reflection to emit from a predetermined light emitting surface with a desired shape of light. Therefore, according to the desired shape of the light emitting surface, various shapes such as a needle-like shape as an indicator needle, a planar shape usable for a light source of backlight for liquid crystal, and the like, can be employed. The light guide 105 is translucent so that light from a light emitting diode or wavelength converted light of the light from the light emitting diode can be emitted from the light emitting surface efficiently. Various materials such as acrylic resin, epoxy resin, and glass can be suitably used for such a light guide 105.

(Light Source)

The light source 106 used in the embodiment is a member capable of emitting light that will be directed to the light guide 105. Examples of the light source include a semiconductor light emitting element such as a light emitting diode and semiconductor laser, a cold cathode tube, or a complex light source that is a combination of variously selected such light sources. Arrangement of the light source to the light guide 105 may employ an edge-guide type that arranges light sources at a side-end surface of the light guide 105 or a directly-beneath type that arranges light sources under the surface of the light guide 105.

(Lower Frame)

The lower frame 108 of the embodiment is a member that defines a recess portion to house a mounting substrate upon which the light sources are disposed, a light guide, and an optical sheet 103, and retains such members. Various materials such as resins, which contain various types of light diffusing agents, and metals can be suitably used for the lower frame 108. Particularly, in view of heat dissipation from the heat generating light emitting diodes and light reflectivity, metals such as nickel, iron, copper, aluminum and alloys such as stainless steel are more suitably used. The size and shape of the lower frame can be varied according to the sizes and shapes of the members to be housed. The optical sheet can be a diffusion film, reflective sheet, prism sheet, and in some case polarizing sheet.

Examples of the invention will be described in detail below. It will be understood that the invention is not limited to these specific examples.

Example 1

Figure 4:
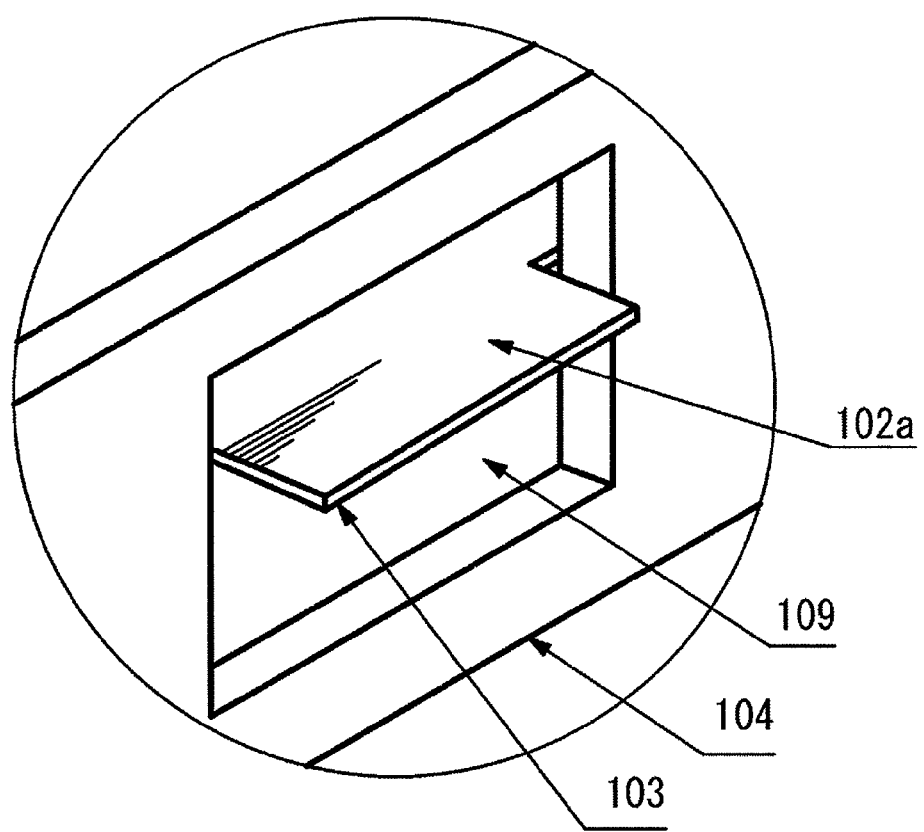
FIG. 4 is a partially enlarged perspective view of a backlight unit according to the invention.

FIG. 1 is a perspective view illustrating each constitutive member of a backlight unit 100 according to the example. FIG. 2 is a top view illustrating a relationship between an inner frame 104 and an optical sheet 103 of a backlight unit 100 according to the example. FIG. 3 is a top view showing an optical sheet 103 of a backlight unit according to the example. FIG. 4 is a partially enlarged perspective view illustrating a relationship between a backlight unit according to the invention.

As shown in FIG. 1, the backlight unit 100 of the example includes a reflection film 107 set in the lower frame 108 having a box shape, a light guide 105 guiding light from the light sources 106 employing light emitting diodes provided on the reflection film 107, optical sheets 103 provided on the light emitting surface of the light guide 105, and an inner frame 104 defining an opening to house the optical sheets 103.

The optical sheets 103 of the example have an approximately rectangular shape with a lateral (in X-direction) length of approximately 45 mm and a longitudinal (in Y-direction) of approximately 47 mm.

Each of a pair of the sides of the peripheral portion in the longitudinal direction (Y-direction) of the optical sheets 103 has a projection group 102 including a first projection 102a and a second projection 102b. The first projection 102a has a width of about 3 mm and protrudes from the general contour (rectangular shape) of each of the optical sheets by as little as about 1.9 mm. The second projection 102b provided alongside the first projection 102a has a width of about 1 mm and protrudes by as little as about 0.7 mm. The distance between the first projection 102a and the second projection 102b is about 2 mm.

The positions of the projection groups 102 provided at a peripheral portion of a pair of opposite sides differ each other in Y-direction. In the example, as shown in FIG. 2 and FIG. 3, in the front view of the optical sheets 103, the second projection 102b at right side longitudinal peripheral portion and the first projection 102a at left side longitudinal peripheral portion are disposed approximately on the level.

As shown in FIG. 2, a projection insertion region 109 is provided in a side wall of the inner frame 104 at a part facing the end portion of the first projection 102a. The projection insertion region 109 of the example is a hole defined through a side wall defining the opening of the inner frame 104 in the width direction, and the first projection 102a is inserted into the hole so that the end portion of the first projection 102a protrudes from the external wall surface of the inner frame 104. The second projection 102b is disposed so that the end portion thereof faces the inner wall surface of the inner frame 104 provided outside of the hole.

The hitting noise generated between the optical sheets and the inner frame can be reduced compared with the conventional configuration, with providing such optical sheets 103 and configuring a backlight unit 100 as described above.

The invention is applicable as a backlight, in which occurrence of hitting among the constituent members is reduced, for cellular phones, liquid crystal display devices for vehicles that are adversely affected by vibrations from the vehicles.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2007-085733 filed in Japan on Mar. 28, 2007, the content of which is incorporated herein by reference.

What is claimed is:

1. A backlight unit comprising:
a light source;
a light guide guiding light from the light source;
an optical sheet formed in a substantially rectangular shape and disposed on the light guide;
an inner frame having side walls defining an opening therebetween for housing the optical sheet; and
a lower frame housing the above; wherein
a peripheral portion of the optical sheet has a first projection at each of a pair of longitudinal sides of the optical sheet,
a side wall of the inner frame has substantially flat inner surface and defines a projection insertion region partially at the flat inner surface to house the first projection,
the peripheral portion of the optical sheet further has a second projection at an other position than that of the first projection, and both the first projection and the second projection are disposed at each of the pair of longitudinal sides of the optical sheet, the second projection is formed smaller than the first projection,
one of the first projections or one of the second projections on the one longitudinal side of the optical sheet is disposed to be shifted from the other first projection or the other second projection on the other longitudinal side of the optical sheet, in a longitudinal direction of the optical sheet, and
the second projection is disposed in the opening of the inner frame to oppose the flat inner surface of the side wall, the flat inner surface extending from outside of the projection insertion region, while the first projection is engaged in the projection insertion region defined in the side wall.

2. The backlight unit according to claim 1, wherein a gap is defined between the second projection and the side wall.

3. The backlight unit according to claim 2 wherein the gap is formed narrower as the optical sheet is thermally expanded and the second projection comes close to the side wall.

4. The backlight unit according to claim 1, wherein a surface of the second projection contacting with the side wall is rounded.

5. The backlight unit according to claim 1, wherein the second projection is spaced away from the first projection on each of the longitudinal sides of the optical sheet, and
the second projection on the one longitudinal side of the optical sheet is disposed to be shifted from to the other second projection on the other longitudinal side thereof, in the longitudinal direction of the optical sheet.

6. The backlight unit according to claim 1, wherein the projection insertion region is a through hole defined in a side wall of the inner frame.

7. The backlight unit according to claim 6, wherein the first projection is in contact with an inner surface of the through hole of the projection insertion region so as to prevent the optical sheet from moving in the longitudinal direction, and the second projection is in contact with the side wall so as to prevent the optical sheet from moving in the lateral direction.

8. A backlight unit comprising:
a light source;
a light guide guiding light from the light source;
an optical sheet formed in a substantially rectangular shape and disposed on the light guide;
an inner frame having side walls defining an opening therebetween for housing the optical sheet; and
a lower frame housing the above;
wherein
a peripheral portion of the optical sheet has a first projection at each of a pair of longitudinal sides of the optical sheet,
a side wall of the inner frame has an substantially flat inner surface and defines a projection insertion region partially at the flat inner surface to house the first projection, the projection insertion region passing through the side wall
the peripheral portion of the optical sheet further has a second projection at an other position than that of the first projection, and
the second projection is disposed outside of the projection insertion region in the opening of the inner frame to oppose the inner surface of the side wall, while the first projection is inserted in the projection insertion region defined in the side wall, and
at least one first projection and at least one second projection are provided on each longitudinal side of the optical sheet, the second projection being spaced away from the first projection at predetermined intervals, and
a pair of the first projection and the second projection on the one longitudinal side of the optical sheet is disposed to be shifted from the other pair of the first projection and the second projection on the other longitudinal side of the optical sheet, in a longitudinal direction of the optical sheet.

9. The backlight unit according to claim 8, wherein an end of the second projection is arranged to face the flat inner surface which is extended outside of the projection insertion region of the side wall.

10. The backlight unit according to claim 9, wherein
the protruding direction of the first projection is substantially the same as the protruding direction of the second projection.

11. The backlight unit according to claim 10, wherein the protruding length of the first projection and the second projection are different, respectively.

12. The backlight unit according to claim 11, wherein the flat inner surface of the side wall is positioned between the end of the first projection and the end of the second projection.

* * * * *